Figure 1:
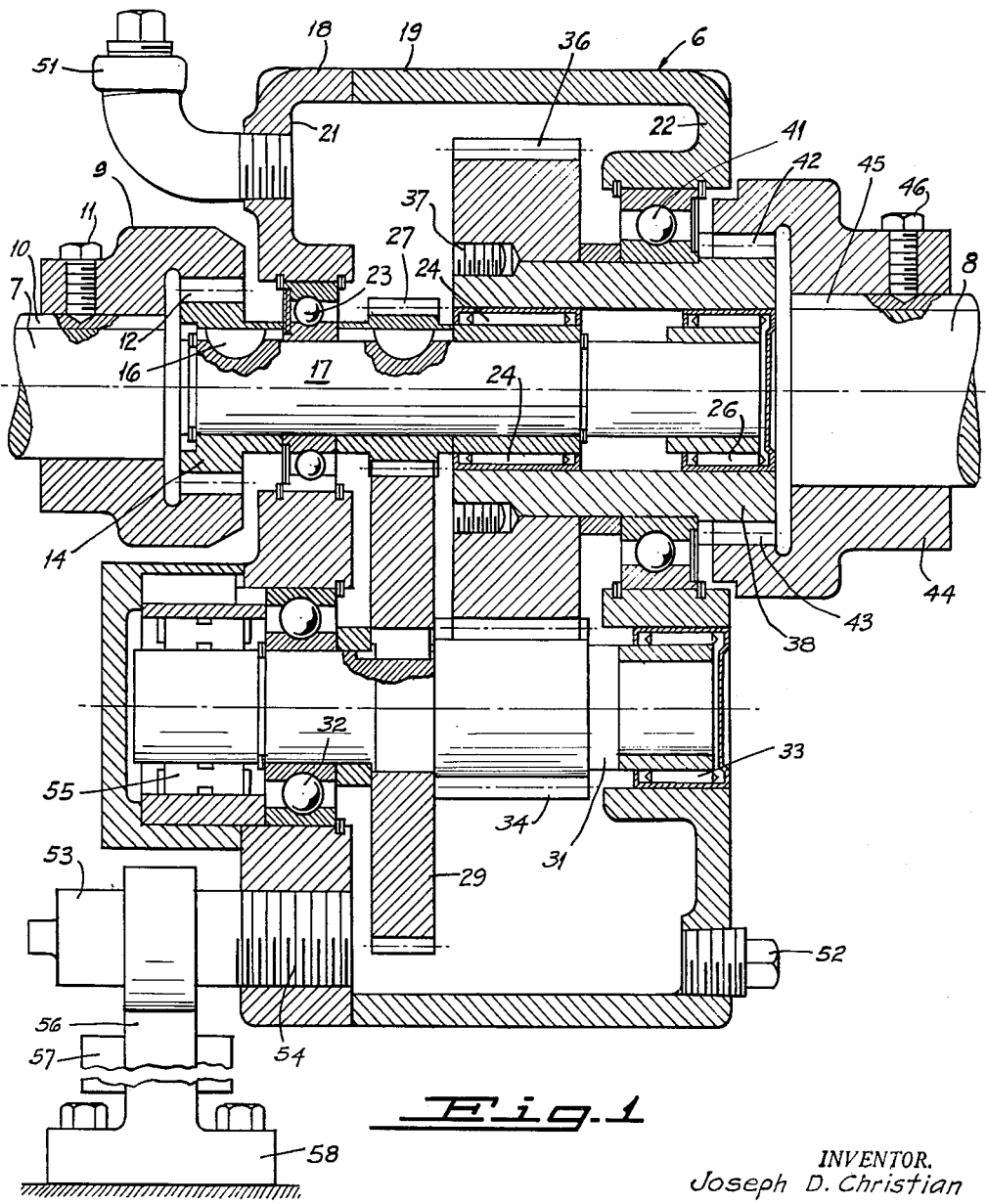

Sept. 12, 1961  J. D. CHRISTIAN  2,999,398
SPEED CHANGE DEVICE
Filed March 26, 1959  2 Sheets-Sheet 1

INVENTOR.
Joseph D. Christian
ECKHOFF & SLICK
ATTORNEYS
BY [signature]
A member of the firm.

Sept. 12, 1961  J. D. CHRISTIAN  2,999,398
SPEED CHANGE DEVICE
Filed March 26, 1959  2 Sheets-Sheet 2
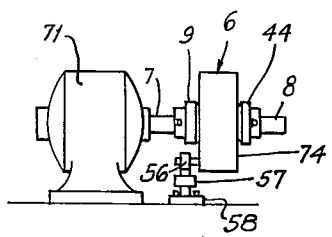
*Fig.2*
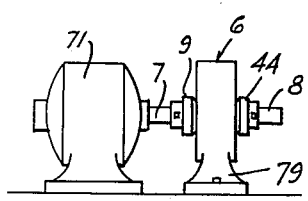
*Fig.3*
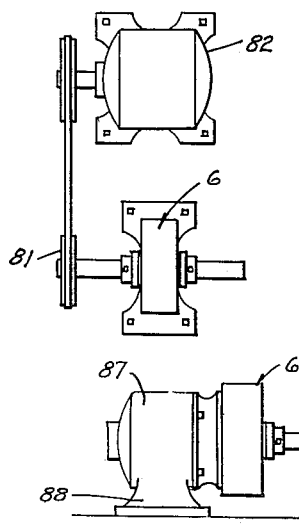
*Fig.4*
*Fig.5*
INVENTOR.
Joseph D. Christian
ECKHOFF & SLICK
ATTORNEYS
BY
A member of the firm

# United States Patent Office 2,999,398
Patented Sept. 12, 1961

2,999,398
SPEED CHANGE DEVICE
Joseph D. Christian, 480 Potrero, San Francisco, Calif.
Filed Mar. 26, 1959, Ser. No. 802,187
1 Claim. (Cl. 74—421)

This invention relates to a new and improved shaft coupling.

In the art of mechanical power transmission it is usual to connect a prime mover to a driven machine by a flexible coupling. Heretofore such couplings have had the single function of mechanically connecting two shafts rotating at identical speeds. They usually are of a type which will tolerate limited misalignment of the two shafts and permit some independent floating of the shafts. Such a flexible coupling generally includes a hub mounted on each shaft, the two hubs being connected by a grid member which can take various forms, e.g., two toothed members connected by a chain, pins and bushings, phenolic blocks, etc.

When it is likely that the misalignment will be substantial, it is common practice to separate the two shaft ends from each other a substantial distance and to provide therebetween a spaced assembly of two flexible couplings so that the angle of misalignment is greatly reduced by reason of the spacing and the coupling grids can adapt more readily to the condition of misalignment.

Most driven machinery requires, in addition to a coupling from the prime mover, some speed reducing means such as gearing, belting, chain and sprockets, etc., to operate the driven mechanism at the proper rotational speed. In some instances this speed reducing means functions also as the "coupling" between the prime mover and the driven machine, such as a V belt drive, a flat belt or a chain drive. When any of these means is used, it is necessary to have a wide offset relationship between the prime mover shaft and the driven shaft, to provide "centers" for the pulleys or sprockets between which the power is transmitted by the belts or chains.

When means, such as a geared speed reducer is employed, it has always been necessary heretofore to fasten such a reducer on a base or on the driven shaft, to carefully align it, to drive it by a coupling to the motor and, from it, by a coupling to the driven shaft. It is also essential to provide a suitable base, a "torque arm" or flange connection to absorb the "reverse torque."

It is an object of the present invention to provide an "in line" device arranged between a driving and a driven shaft, combining therein, in one unit, the function of a flexible coupling, or universal joint, and the function of a geared speed reducer, together with means for absorbing any misalignment of the shafts, permitting independent floating of the shafts within limits and accomplishing, between these shafts, a difference in rotational speed, i.e., the driven shaft may rotate at a faster or slower r.p.m. than the driving shaft.

Since the transmission of power between the prime mover and the driven shaft is accomplished by gearing positively positioned by bearings in an inflexible relationship whereby positive alignment of all parts is at all times required, it will be seen that a unique design and arrangement has been provided that not only maintains this alignment but, simultaneously, permits substantial misalignment of the shafts, and independent floating of same, all while performing the function of a flexible coupling.

This arrangement of parts has accomplished great compactness of design and reduction of physical dimensions, reduction of weight and bulk, and simple manufacturing technique. The arrangement accomplishes a wide spread in bearings. This device can be provided with an input shaft, an output shaft and a base, to function as an "in line" coaxial speed reducer of extremely compact arrangement. Bearing capacities on the input shaft are enhanced by unidirectional relative rotation of the outer and inner races.

It is a further object of this invention to provide a speed reducer having an input shaft concentric with a hollow output shaft, the input shaft being supported by at least one bearing supported in the hollow shaft. Since the shafts turn in the same direction, the load on the bearing is greatly reduced.

In the drawings accompanying and forming a part hereof, FIGURE 1 is a side elevation partly in section through a speed reducer-shaft coupling device embodying the present invention.

FIGURES 2 through 5 are schematic views, illustrating various forms of construction of the shaft coupling device of this invention in combination with a prime mover.

Referring to FIGURE 1 in the drawing, one form of device embodying the present invention is indicated generally by the numeral 6 and is shown as mounted between the input shaft 7 of a suitable prime mover, such as an electric motor, and a shaft 8 connected to a machine or device to be driven. The connection to the input shaft 7 is by a flexible coupling 9 mounted upon the shaft 7 and secured in place by key 10 and set screw 11. At one end, the flexible coupling 9 is provided with an internal gear 12, the latter fitting upon a matching spur gear 14 secured by key 16 to an input shaft 17.

To provide support for the input shaft and various other units, as will be described, a suitable casing structure is provided. For convenience, this is shown as made in two parts, 18 and 19, suitably joined together and including opposite spaced walls 21 and 22. The input shaft 17 is mounted in wall 21 by ball bearing 23; it is also supported for rotation by needle or roller bearings 24 and 26, these being suitably supported, as will be presently described.

To provide for a reduction in speed between the input shaft 17 and the output shaft 8, a high speed pinion gear 27 is secured by key 28 to the shaft 17. The pinion gear 27 is in mesh with a high speed gear 29, secured in turn to counter shaft 31. The counter shaft is supported by ball bearing 32 in wall 21 and by a needle or roller bearing 33 in the wall 22.

Mounted upon the shaft 31 is a low speed pinion 34 driving a larger low speed gear 36, the latter being secured by screw dowels 37 upon an annulus 38, in which the aforementioned needle bearings 24 and 26 on the high speed shaft 17 are supported. Since shafts 17 and annular shaft 38 rotate in the same direction, the rotational speed effective in bearings 24 and 26 is the difference between the two. As a result, the load on bearings 24 and 26 is greatly reduced and much smaller bearings can be employed as compared to those required when the shafts are not so supported.

The annular member 38 is supported in wall 22 by the ball bearings 41. At its outer end, the annular member includes a spur gear 42 which is, in turn, enmeshed with an internal gear 43 in a flexible coupling 44, the latter being secured by key 45 and set screw 46 on the end of the shaft 8.

To provide for suitable lubrication of the several gears in the casing, a filling connection is provided at 51 and a lubricant drain is provided by plug 52. A back stop 55 is mounted on an end of shaft 31 to permit that shaft to rotate in only one direction. Such anti-rotation devices are conventional in the art.

To retain the device in place against rotation, rod 53 is inserted in the threaded opening 54 in the casing wall 22, rod 53 being connected by lever 56 through an overload device 57 (FIGURE 2) to a suitable base 58. As is well-known in the art, the overload device 57 is such that if too much torque is applied to the speed change unit 6, the overload unit is actuated and the circuit to the electric motor, for example, is broken.

The device can be employed in various ways; for example, referring to FIGURE 2, I have shown a prime mover 71 having an output shaft 7 and connected by a coupling 9 to a speed change unit 6 of this invention. At its other end, the unit is connected by a coupling 44 to the shaft 8 of a driven machine. The torque applied to the unit 74 is taken up by the torque arm 56 and overload unit generally indicated at 57.

The unit shown in FIGURE 3 is like that shown in FIGURE 2 except that the speed change unit 6 is shown as mounted upon a separate base 79. In FIGURE 4, the speed change unit 6 is shown as being driven by a chain and sprocket or a V-belt drive, generally indicated at 81 from a prime mover 82.

In FIGURE 5, the speed change unit 6 is shown as flange mounted upon a standard motor 87, the entire unit being supported from the motor base 88.

From the foregoing, I believe it will be apparent that I have provided a novel, simple and improved speed change coupling device which can be used to advantage in power transmission.

I claim:

A speed change device adapted to be mounted between a high speed driving shaft and a coaxial low speed driven shaft, said device comprising a casing having opposite first and second walls, a first gear wheel, a tubular shaft carrying said first gearwheel and extending on each side of the second wall, a first bearing mounted on the tubular shaft and supported in the second wall, a second driven shaft coaxial with the tubular shaft and extending on each side of the first wall with one end thereof extending into said tubular shaft and substantially coextensive with the tubular shaft through the second wall, a second bearing supporting the second driven shaft in the first wall, a third bearing mounted on the second shaft and supporting the tubular shaft on the second shaft, said third bearing being located at the position where the tubular shaft carries the first gearwheel so that the third bearing is located within the first gearwheel, a fourth bearing located within the tubular shaft and carrying the end of the second driven shaft, said fourth bearing being located within the end of the tubular shaft where it protrudes outside the casing, a second gearwheel on the second driven shaft between the second and third bearings, a counter-shaft supported in the first and second walls, a third gearwheel mounted on the counter-shaft and enmeshed with the gearwheel on the tubular shaft, a first and a second flexible coupling respectively mounted between the driving shaft and the second driven shaft and the tubular shaft and the low speed driven shaft to rotate the low speed driven shaft from the high speed driving shaft and support the speed change device in position between the high speed driving shaft and the low speed driven shaft.

References Cited in the file of this patent
UNITED STATES PATENTS

| | | |
|---|---|---|
| 1,629,180 | Smith | May 17, 1927 |
| 1,674,200 | Gotten | June 19, 1928 |
| 1,980,933 | Simons | Nov. 13, 1934 |
| 2,116,166 | Christian | May 3, 1938 |
| 2,185,545 | Egan | Jan. 2, 1940 |
| 2,496,857 | Cronstedt et al. | Feb. 7, 1950 |
| 2,504,066 | Christian | Apr. 11, 1950 |
| 2,596,794 | Schmitter | May 13, 1952 |
| 2,679,735 | Rowe | June 1, 1954 |
| 2,769,323 | O'Malley | Nov. 6, 1956 |